(12) United States Patent
MacLean et al.

(10) Patent No.: US 7,732,736 B2
(45) Date of Patent: Jun. 8, 2010

(54) HOT MELT ADHESIVE HOSE ASSEMBLY WITH THERMAL FUSE LINK

(75) Inventors: Mairi MacLean, Hendersonville, TN (US); Dieter B. Heerdt, Hendersonville, TN (US); Christopher R. Fuller, Nashville, TN (US)

(73) Assignee: Illinois Tool Works Inc., Glenview, IL (US)

( * ) Notice: Subject to any disclaimer, the term of this patent is extended or adjusted under 35 U.S.C. 154(b) by 560 days.

(21) Appl. No.: 11/730,319

(22) Filed: Mar. 30, 2007

(65) Prior Publication Data

US 2008/0237210 A1 Oct. 2, 2008

(51) Int. Cl.
  H05B 3/02 (2006.01)
  H05B 3/58 (2006.01)
  B67D 7/32 (2010.01)
  B67D 7/82 (2010.01)

(52) U.S. Cl. .................. 219/221; 219/481; 219/517; 392/472; 392/480; 222/146.5

(58) Field of Classification Search ............... None
See application file for complete search history.

(56) References Cited

U.S. PATENT DOCUMENTS

| | | | |
|---|---|---|---|
| 3,693,535 A | 9/1972 | Abel, Jr. | |
| 3,716,693 A * | 2/1973 | Bleckmann | 219/553 |
| 3,733,460 A | 5/1973 | Ryckman, Jr. | |
| 4,139,761 A | 2/1979 | Obrowski | |
| 4,214,148 A | 7/1980 | Fleischhauer | |
| 4,256,181 A * | 3/1981 | Searcy | 169/65 |
| 4,358,664 A | 11/1982 | Kronseder | |
| 4,553,023 A * | 11/1985 | Jameson et al. | 392/472 |
| 4,613,745 A | 9/1986 | Marotta et al. | |
| 4,616,894 A | 10/1986 | Baker | |
| 4,716,520 A | 12/1987 | Locke, Jr. et al. | |
| 4,852,544 A | 8/1989 | Williams et al. | |
| 5,229,581 A * | 7/1993 | Boulet d'Auria | 219/535 |
| 5,381,511 A * | 1/1995 | Bahar et al. | 392/472 |
| 5,408,577 A | 4/1995 | Weber, Jr. et al. | |
| 5,557,704 A | 9/1996 | Dennis et al. | |
| 5,832,178 A * | 11/1998 | Schave | 392/472 |
| 6,049,658 A * | 4/2000 | Schave et al. | 392/472 |

(Continued)

FOREIGN PATENT DOCUMENTS

EP 1251302 10/2002

(Continued)

*Primary Examiner*—Joseph M Pelham
(74) *Attorney, Agent, or Firm*—Law Offices of Steven W. Weinrieb

(57) ABSTRACT

A hot melt adhesive hose assembly comprises a heater circuit wrapped around an external surface portion of the hose assembly, a temperature sensor, and an elongated thermal fuse which is likewise wrapped around an external surface portion of the hose assembly such that successive spiral turns of the thermal fuse are effectively interposed between successive spiral turns of the heater circuit. The thermal fuse may be electrically connected in series with the heater circuit so as to effectively terminate electrical power to the heater circuit as a result of the melting of the thermal fuse, or alternatively, the thermal fuse may be electrically connected in series with the temperature sensor, so as to detect abnormal temperature levels at substantially any location throughout the length of the hose assembly.

20 Claims, 2 Drawing Sheets

U.S. PATENT DOCUMENTS

| | | |
|---|---|---|
| 6,142,974 A | 11/2000 | Kistner et al. |
| 6,168,049 B1 | 1/2001 | Bolyard, Jr. |
| 6,342,264 B1 | 1/2002 | Raterman et al. |
| 6,549,034 B1 | 4/2003 | Pietrzyk et al. |
| 6,624,397 B2 | 9/2003 | Tateishi |
| 6,738,566 B2 * | 5/2004 | Pagnella ............... 392/472 |
| 7,084,377 B2 * | 8/2006 | Raterman et al. ........... 219/481 |
| 7,266,293 B1 * | 9/2007 | Dundas ..................... 392/478 |
| 2005/0092736 A1 | 5/2005 | Raterman et al. |

FOREIGN PATENT DOCUMENTS

| | | |
|---|---|---|
| WO | WO 2007/047042 | 4/2007 |

* cited by examiner

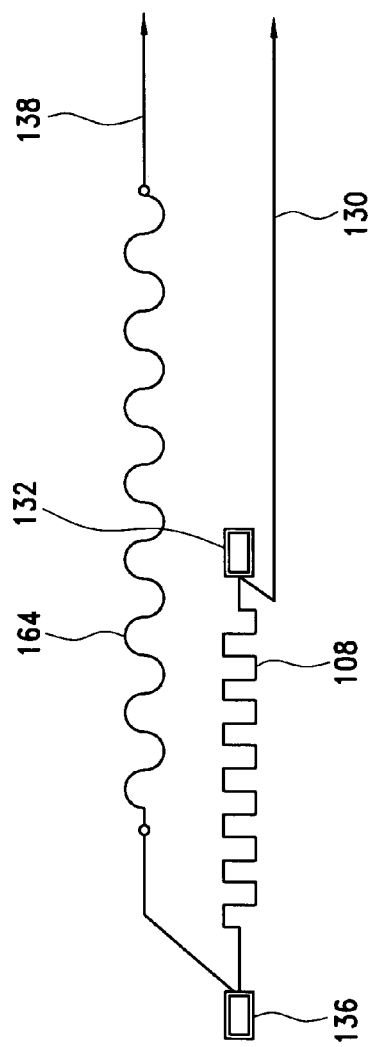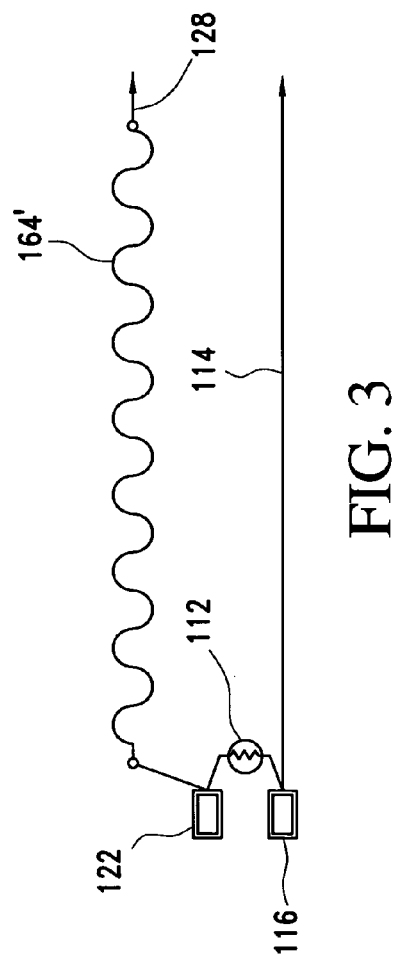

HOT MELT ADHESIVE HOSE ASSEMBLY WITH THERMAL FUSE LINK

FIELD OF THE INVENTION

The present invention relates generally to hot melt adhesive dispensing systems, and more particularly to a new and improved hot melt adhesive hose assembly wherein a thermal fuse or fusible link is operatively associated therewith and effectively runs the length of the hose assembly as a result of being wrapped or coiled around the hot melt adhesive hose assembly in conjunction with the hot melt adhesive heating circuit or resistance wire, or alternatively, in conjunction with the hot melt adhesive temperature sensor, temperature sensing device, or temperature sensing element, so as to effectively detect or sense an abnormal temperature level at any point or location along the length of the hot melt adhesive hose assembly, and wherein further, as a result of the melting and the opening of the electrical circuit, operatively associated with the hot melt adhesive heating circuit or resistance wire, or operatively associated with the hot melt adhesive temperature sensor, temperature sensing device, or temperature sensing element, at a predetermined temperature level, that is, when the hot melt adhesive hose assembly attains a temperature level or value which is within a predetermined temperature range, electrical power to the hot melt adhesive heater circuit or resistance wire will effectively be terminated thereby preventing thermal degradation of, or thermal damage to, the hot melt adhesive hose assembly.

BACKGROUND OF THE INVENTION

In connection with hot melt adhesive dispensing systems, and more particularly, in connection with hot melt adhesive hose assemblies, conventional hot melt adhesive hose assemblies are respectively provided with hot melt adhesive heating circuits or resistance wires, which are wrapped or coiled around the hot melt adhesive hoses so as to effectively heat the hot melt adhesive materials disposed within and being conducted through the hot melt adhesive hoses to applicator heads and dispensing module assemblies. In addition, the conventional hot melt adhesive hose assemblies are also respectively provided with temperature sensors, temperature sensing devices, or temperature sensing elements, which normally sense the operating temperatures of the hot melt adhesive hose assemblies and which effectively control the energization of the hot melt adhesive heating circuits or resistance wires, through means of suitable controllers or control mechanisms, so as to effectively maintain the operating temperatures of the hot melt adhesive hoses, and correspondingly, the temperatures of the hot melt adhesive materials disposed internally within the hot melt adhesive hoses, at predeterminedly desired temperatures or within predeterminedly desired temperature ranges. Under certain conditions, however, and for any one of various reasons, the hot melt adhesive hoses can, in effect, develop hot spots or localized areas or regions wherein the prevailing temperature levels are not only above the normally desired or predetermined operating temperatures, but in addition, the temperature levels exceed the flammability ratings of the hose construction materials. Such temperature levels present thermally unstable conditions for the hot melt adhesive hoses in that the hoses can experience thermal degradation and damage. In connection with conventionally constructed hoses, while, as noted hereinbefore, the provision and presence of the temperature sensors, temperature sensing devices, or temperature sensing elements normally or generally maintain the operating temperatures of the hot melt adhesive hoses at predeterminedly desired temperature levels, or within predeterminedly desired temperature ranges, sometimes the temperature sensors, temperature sensing devices, or temperature sensing elements may be located at physical locations which are remote from those areas or regions of the hot melt adhesive hose assemblies which are experiencing the hot spots or relatively dangerous or undesirably elevated temperature levels. Accordingly, the temperature sensors, temperature sensing devices, or temperature sensing elements may not be able to detect such abnormally high temperature levels within a sufficiently quick or relatively short period of time in order to effectively terminate electrical power to the hot melt adhesive heating circuits or resistance wires in order to effectively prevent the aforenoted thermal degradation and damage to the hot melt adhesive hose assemblies.

A need therefore exists in the art for a new and improved hot melt adhesive hose assembly wherein means can be provided upon, or in conjunction with, the hot melt adhesive hose assembly whereby localized points or regions of excessively high temperature levels, which exceed, for example, the flammability rating of the hot melt adhesive hose assembly and which could therefore thermally degrade or damage the structural integrity of the hot melt adhesive hose assembly if not in fact quickly detected, can effectively be detected at substantially any point along substantially the entire axial length of the hot melt adhesive hose assembly and can effectively terminate electrical power to the hot melt adhesive heating circuits or resistance wires.

SUMMARY OF THE INVENTION

The foregoing and other objectives are achieved in accordance with the teachings and principles of the present invention through the provision of a new and improved hot melt adhesive hose assembly which comprises a hot melt adhesive heating circuit or resistance wire wrapped in a substantially spiral manner around an external surface portion of the hot melt adhesive hose assembly, and an elongated thermal fuse or fusible link which is likewise wrapped in a substantially spiral manner around the external surface portion of the hot melt adhesive hose assembly such that successive spiral turns of the elongated thermal fuse or fusible link are effectively disposed parallel to, but axially spaced from, the successive spiral turns of the hot melt adhesive heating circuit or resistance wire by means of a predetermined axial spacing or pitch. In addition, the elongated thermal fuse or fusible link may be electrically connected in series with the hot melt adhesive heating circuit or resistance wire so as to effectively terminate electrical power to the hot melt adhesive heating circuit or resistance wire as a result of the melting of the thermal fuse or fusible link, and the consequent opening of the electrical power circuit or path within which the hot melt adhesive heating circuit or resistance wire and the thermal fuse or fusible link are disposed, when the thermal fuse or fusible link experiences or detects an excessively high temperature level or value. Alternatively, the elongated thermal fuse or fusible link may be electrically connected in series with the hot melt adhesive temperature sensor, temperature sensing device, or temperature sensing element so as to likewise effectively terminate electrical power to the hot melt adhesive heating circuit or resistance wire, through means of the hot melt adhesive assembly controller or an alarm system summoning operator personnel, as a result of the melting of the thermal fuse or fusible link, and the consequent opening of the electrical power circuit or path within which the hot melt adhesive temperature sensor, temperature sensing device, or temperature sensing element, and the thermal fuse or fusible link, are disposed, when the thermal fuse or fusible link experiences or detects an excessively high temperature level or value.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 2 is a schematic wiring diagram showing the incorporation of the thermal fuse or fusible into the hot melt adhesive assembly electrical circuitry wherein, more particularly, the thermal fuse or fusible link is illustrated as being disposed in series with the hot melt adhesive heating circuit or resistance wire; and FIG. 3 is a schematic wiring diagram showing the incorporation of the thermal fuse or fusible into the hot melt adhesive assembly electrical circuitry wherein, more particularly, the thermal fuse or fusible link is illustrated as being disposed in series with the hot melt adhesive temperature sensor, temperature sensing device, or temperature sensing element.

DETAILED DESCRIPTION OF THE PREFERRED EMBODIMENT

Figure 1:
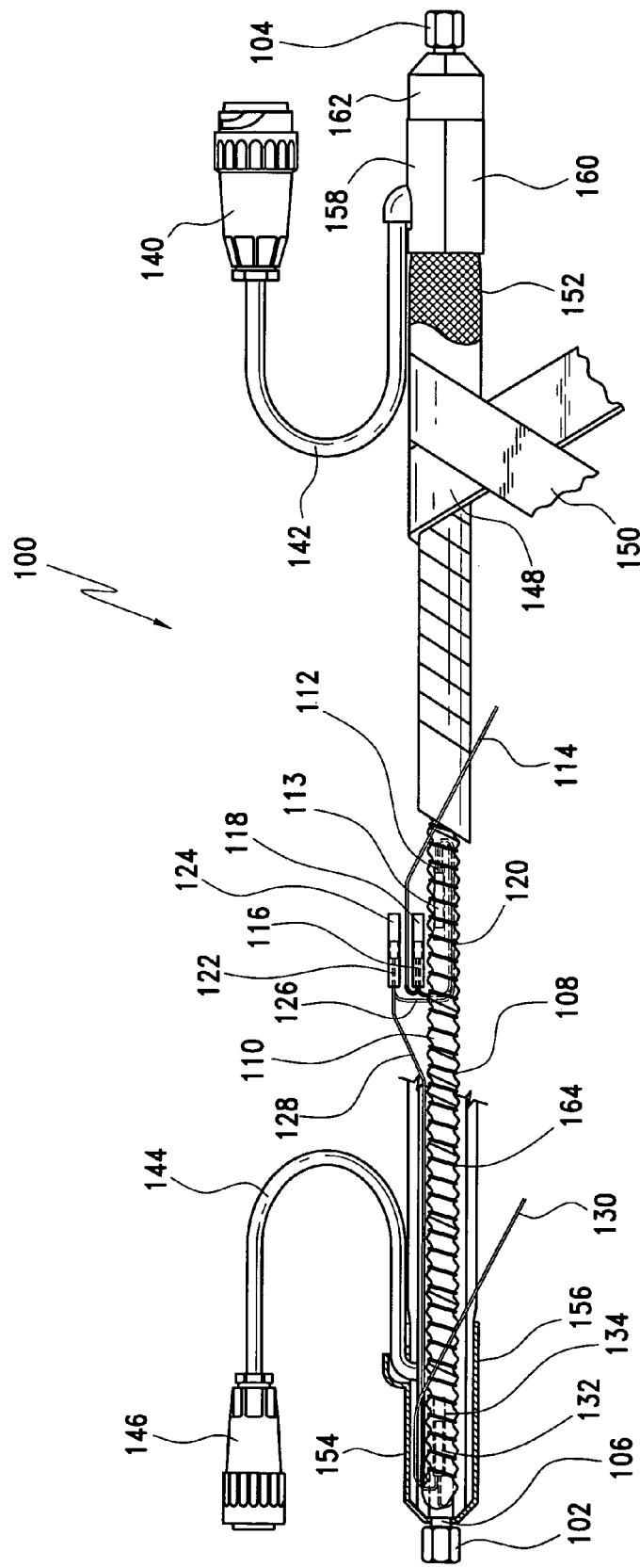
FIG. 1 is a schematic view of a new and improved hot melt adhesive hose assembly, and its operatively associated thermal fuse or fusible link, as constructed in accordance with the principles and teachings of the present invention and showing the cooperative parts thereof.

Referring now to the drawings, and more particularly to FIG. 1 thereof, a new and improved hot melt adhesive hose assembly, for dispensing hot melt adhesive material, as constructed in accordance with the principles and teachings of the present invention, is disclosed and is generally indicated by the reference character 100. More particularly, the new and improved hot melt adhesive hose assembly 100 is seen to comprise an applicator end upon which there is disposed a first end fitting 102 for operative connection to a hot melt adhesive dispensing applicator, nozzle, or the like, and an adhesive supply unit end upon which there is disposed a second end fitting 104 for operative connection to a hot melt adhesive material supply source. The end fittings 102,104 are disposed upon opposite ends of a tubular member 106, which is fabricated from TEFLON®, and accordingly, the end fittings 102,104 and the TEFLON® tubular member 106 comprise the hose core. It is seen that the hose core extends coaxially through the entire hot melt adhesive hose assembly 100 so as to fluidically connect the hot melt adhesive supply end of the hot melt adhesive hose assembly 100 to the hot melt adhesive applicator or dispensing end of the hot melt adhesive hose assembly 100 so as to thereby, in turn, provide a flow path for the hot melt adhesive material, as supplied to the hot melt adhesive hose assembly 100 from the hot melt adhesive supply source, not shown, to the hot melt adhesive applicator or dispensing nozzles, also not shown.

As is well known in the art, hot melt adhesive material is normally supplied to a hot melt adhesive hose assembly, from a hot melt adhesive supply unit, not shown, in a heated state, and a heater circuit is operatively associated with the hot melt adhesive hose assembly in order to maintain the hot melt adhesive material at a predetermined temperature level, while the same is being conducted through the hot melt adhesive hose assembly, such that the hot melt adhesive material will have or exhibit the proper viscosity properties when the hot melt adhesive material is dispensed from the applicator end of the hot melt adhesive hose assembly 100. Accordingly, it is seen that a hot melt adhesive heating circuit or resistance wire 108 is adapted to be disposed around an external surface portion of the tubular member 106 in a spirally wrapped manner, although it is to be noted the hot melt adhesive heating circuit or resistance wire 108 is not disposed in direct contact with the external peripheral surface portion of the tubular member 106, but to the contrary, is adapted to be coiled or wrapped around the external peripheral surface of a multi-layer cylindrical or tubular laminate.

More particularly, as more fully disclosed within U.S. patent application Ser. No. 11/123,053, entitled HOT MELT ADHESIVE HOSE ASSEMBLY HAVING REDUNDANT COMPONENTS, and filed on May 6, 2005, which is hereby incorporated by reference, the tubular member 106 has a suitable stainless steel wire braid-type woven layer, not shown, disposed therearound, and the stainless steel wire braid-type woven layer is covered by means of a first layer of KAPTON® tape, not shown, which is preferably wrapped in accordance with a fifty-percent (50%) overlap technique. A second fiberglass tape, also not shown, having a suitable adhesive disposed only upon the internal side surface thereof, is wrapped around or atop the KAPTON® tape, preferably in accordance with a similar fifty-percent (50%) overlap technique, and a third fiberglass tape 110, having a suitable adhesive disposed upon both the internal and external side surfaces thereof, is wrapped around or atop the second fiberglass tape. As a result of the third fiberglass tape 110 being coated upon both the internal and external side surfaces thereof with a suitable adhesive, the hot melt adhesive heater circuit or resistance wire 108 may be readily adhered thereto, it being further noted that the hot melt adhesive heater circuit or resistance wire 108 is wrapped or wound around the external peripheral surface of the underlying third fiberglass tape 110 in accordance with a predeterminedly selected pitch or spacing being defined between successive coils or windings of the hot melt adhesive heater circuit or resistance wire 108.

Continuing further, as is also well known in the art, a temperature sensor, temperature sensing device, or temperature sensing element 112 is operatively associated with the hot melt adhesive hose assembly 100 so as to effectively detect or sense the temperature level of the hot melt adhesive material being conducted through the hot melt adhesive hose assembly 100 so as to, again, ensure that the hot melt adhesive material is in fact at the proper temperature level, while the same is being conducted through the hot melt adhesive hose assembly, such that the hot melt adhesive material will have or exhibit the proper viscosity properties when the hot melt adhesive material is to be dispensed from the applicator end of the hot melt adhesive hose assembly 100. The temperature sensor, temperature sensing device, or temperature sensing element 112 is adapted to be disposed externally of the aforenoted multi-layer cylindrical or tubular laminate, and it is noted that the temperature sensor, temperature sensing device, or temperature sensing element 112 may comprise either a resistance temperature detector (RTD), a thermistor, or a thermocouple.

Still yet further, it is also noted that the temperature sensor, temperature sensing device, or temperature sensing element 112 is adapted to be respectively encased within suitable insulation, such as, for example, a fiberglass sleeve 113, and that power to the temperature sensor, temperature sensing device, or temperature sensing element 112 is provided by means of an electrical circuit which comprises a first temperature sensor lead wire 114, a first temperature sensor terminal 116 encased within suitable insulation, such as, for example, a silicone rubber-covered fiberglass sleeve 118, a first temperature sensor connecting wire 120 interconnecting the first temperature sensor terminal 116 to the temperature sensor, temperature sensing device, or temperature sensing element 112, a second temperature sensor terminal 122 also encased within suitable insulation, such as, for example, a silicone rubber-covered fiberglass sleeve 124, a second temperature sensor connecting wire 126 interconnecting the temperature sensor, temperature sensing device, or temperature sensing element 112 to the second temperature sensor terminal 122, and a second temperature sensor lead wire 128. In a similar manner, power to the hot melt adhesive heater circuit or resistance wire 108 is provided by means of an electrical circuit which comprises a first heater circuit lead wire 130, a first heater circuit terminal 132 encased within suitable insulation, such as, for example, a silicone rubber-covered fiberglass sleeve 134, a second heater circuit terminal 136 which is schematically illustrated within FIG. 2 and which is also encased within a suitable insulation, such as, for example, a silicone rubber-covered fiberglass sleeve, not shown, wherein the hot melt adhesive heater circuit or resistance wire 108 extends between and electrically interconnects the first and second heater circuit terminals 132,136, and a second lead wire 138.

The temperature sensor, temperature sensing device, or temperature sensing element 112, and all of the terminals 116,122,132,136, respectively provided in conjunction with the temperature sensor, temperature sensing device, or temperature sensing element 112, and the hot melt adhesive heater circuit or resistance wire 108, are adapted to be secured to external side surface portions of the aforenoted multi-layer cylindrical or tubular laminate, comprising the hot melt adhesive hose assembly 100, by means of suitable fiberglass tape, and subsequently, the lead wires 114,128,130,138 for the temperature sensor, temperature sensing device, or temperature sensing element 112, and for the hot melt adhesive heater circuit or resistance wire 108 are wrapped or coiled around the external side surface portions of the aforenoted multi-layer cylindrical or tubular laminate, comprising the hot melt adhesive hose assembly 100, conducted back toward the adhesive supply unit end of the hot melt adhesive hose assembly 100, and are adapted to be electrically connected to a first electrical connector assembly 140 through means of a first coaxial electrical cable 142. The first coaxial electrical cable 142 and the first electrical connector assembly 140 comprise additional electrical wires or conductors, not shown, which serve to provide electrical connections to various electrical components at the adhesive supply unit end of the hot melt adhesive hose assembly 100, such as, for example, hot melt adhesive material supply valving, hot melt adhesive material supply pumps, and the like. In a similar manner, it is noted that additional wires or electrical conductors, also not shown, are electrically connected to a second coaxial electrical cable 144 which, in turn, is electrically connected to a second electrical connector assembly 146, the various additional wires or electrical conductors, not shown, serving to provide electrical connections to various electrical components at the applicator end of the hot melt adhesive hose assembly 100, such as, for example, solenoid-controlled dispensing or discharge control valving, dispensing or discharge nozzle structures, and the like.

In order to complete the entire hot melt adhesive hose assembly 100, all of the aforenoted wiring 114,128,130, 138 are also secured by means of fiberglass tape, and the laminated assembly is then adapted to be wrapped within insulation felt 148 which is wrapped in accordance with a fifty-percent (50%) overlap technique. An orange-colored vinyl tape 150, having, for example, a company name, logo, or other indicia or information printed thereon, is then wrapped over the insulation felt 148, and a transparent braid sleeve member 152, fabricated, for example, from polyethylene terephthalate (PET), is then slid over the orange-colored vinyl tape 150, although it is noted, of course, that other types of tapes or sleeve members may be utilized. Lastly, cuff members 154,156 and 158,160, which may comprise mating-half sections or housings, are secured around the opposite applicator and adhesive supply unit ends of the hot melt adhesive hose assembly 100, and a product or data label 162 may be applied around the cuff housing, comprising the cuff members 158,160 at the adhesive supply unit end of the hot melt adhesive hose assembly 100. Again, however, in lieu of the two-part mating half cuff members, other covering or insulating techniques or structures, such as, for example, shrink-wrapping, or the like, may be employed.

Having described substantially all or most of the basic or more prominent components comprising a typical hot melt adhesive hose assembly, it is noted, and can be readily appreciated, that when a conventional hot melt adhesive hose assembly comprises a single temperature sensor, temperature sensing device, or temperature sensing element, such as, for example, a temperature sensor, temperature sensing device, or temperature sensing element similar to the temperature sensor, temperature sensing device, or temperature sensing element 112, or even when a hot melt adhesive hose assembly comprises dual or redundant temperature sensors, temperature sensing devices, or temperature sensing elements as have been disclosed within the aforenoted United States patent application entitled HOT MELT ADHESIVE HOSE ASSEMBLY HAVING REDUNDANT COMPONENTS, filed on May 6, 2005, and assigned Ser. No. 11/123,053, the one or more temperature sensors, temperature sensing devices, or temperature sensing elements will effectively detect the prevailing temperature levels or values of the hot melt adhesive hose assembly 100 which are effectively characteristic of those regions of the hot melt adhesive hose assembly 100 which are only substantially adjacent to, or within the relatively immediate vicinity of, the temperature sensors, temperature sensing devices, or temperature sensing elements. Accordingly, if under certain conditions, and for any one of various reasons, the hot melt adhesive hoses develop hot spots or localized areas or regions which are remote from the locations of the temperature sensors, temperature sensing devices, or temperature sensing elements, wherein the prevailing temperature levels are not only above the normally desired or predetermined operating temperatures, but in addition, the temperature levels exceed the flammability ratings of the hose construction materials such that the temperature levels can present thermally unstable conditions for the hot melt adhesive hoses in that the hoses can experience thermal degradation and damage, the temperature sensors, temperature sensing devices, or temperature sensing elements may not be able to detect such abnormally high temperature levels within a sufficiently quick or relatively short period of time in order to effectively terminate electrical power to the hot melt adhesive heating circuits or resistance wires in order to effectively prevent the aforenoted thermal degradation and damage to the hot melt adhesive hose assemblies.

Therefore, in accordance with the principles and teachings of the present invention, there has been provided, in conjunction with and as an integral component part of the new and improved hot melt adhesive hose assembly 100, an elongated thermal fuse or fusible link 164 which is adapted to be disposed around the external surface portion of the tubular member 106 in a spirally wrapped manner similar to the disposition of the hot melt adhesive heater circuit or resistance wire 108. More particularly, as was the case with the hot melt adhesive heater circuit or resistance wire 108, the elongated thermal fuse or fusible link 164 is not disposed in direct contact with the external peripheral surface portion of the tubular member 106, but to the contrary, is adapted to be coiled or wrapped around the external peripheral surface of a multi-layer cylindrical or tubular laminate. In addition, it is also noted that, as was the case with the hot melt adhesive heater circuit or resistance wire 108, in view of the fact that the third fiberglass tape 110 is effectively coated upon both the internal and external side surfaces thereof with a suitable adhesive, the elongated thermal fuse or fusible link 164 may be readily adhered thereto. Still yet further, it is noted that the elongated thermal fuse or fusible link 164 is wrapped or wound around the external peripheral surface of the underlying third fiberglass tape 110 in accordance with a predeterminedly selected pitch or axial spacing being defined between successive coils or windings of the elongated thermal fuse or fusible link 164, and that the individual successive coils or windings of the elongated thermal fuse or fusible link 164 are interposed between individual successive coils or windings of the hot melt adhesive heater circuit or resistance wire 108 in an alternating fashion.

The elongated thermal fuse or fusible link 164 may be fabricated from a suitable material, such as, for example, a suitable solder composition, which will melt at a predetermined temperature level or value so as to effectively open or break the electrical circuit within which the elongated thermal fuse or fusible link 164 is disposed so as to terminate electrical power to the hot melt adhesive heater circuit or resistance wire 108. One example of such a suitable solder composition or material is that comprising or known as a 95-5 solder composition or material, which comprises 95% tin and 5% antimony. Accordingly, in view of the fact that the elongated thermal fuse or fusible link 164 will melt at a predetermined temperature level or value which is above the normal operating temperature level, value, or range of the hot melt adhesive hose assembly 100, but which is below a temperature level or value which would exceed the flammability rating of the hot melt adhesive hose assembly 100 whereby the structural integrity of the hot melt adhesive hose assembly 100 would be compromised and the hot melt adhesive hose assembly 100 would suffer thermal degradation and damage, electrical power to the hot melt adhesive heater circuit or resistance wire 108 will effectively be terminated whereby the aforenoted adverse effects upon, and structural damage to the hot melt adhesive hose assembly 100, will be prevented or avoided.

It can therefore be appreciated that, as a result of the provision of the elongated thermal fuse or fusible link 164 upon, or incorporated within, the hot melt adhesive hose assembly 100, wherein the elongated thermal fuse or fusible link 164 effectively extends substantially throughout the entire axial length of the hot melt adhesive hose assembly 100, then the elongated thermal fuse or fusible link 164 can effectively detect, and respond to, an elevated or excessive temperature level or value which may occur within substantially any area or region of the hot melt adhesive hose assembly 100. It will therefore be appreciated that the viability and structural integrity of the hot melt adhesive hose assembly 100 is no longer solely dependent upon the detection of such elevated or excessive temperature levels or values within those localized areas or regions which are adjacent to, or within the immediate vicinity of, the one or more temperature sensors, temperature sensing devices, or temperature sensing elements 112.

With reference being made to FIG. 2, it can be further appreciated that in accordance with first principles and teachings of the present invention, the elongated thermal fuse or fusible link 164 may be disposed within the electrical circuit providing electrical power to the hot melt adhesive heater circuit or resistance wire 108. More particularly, the elongated thermal fuse or fusible link 164 may effectively be incorporated within the second lead wire 138 so as to effectively be disposed in series with the hot melt adhesive heater circuit or resistance wire 108. In this manner, if the thermal fuse or fusible link 164 experiences or detects an elevated temperature level or value, at any particular region or area of the hot melt adhesive hose assembly 100, which exceeds its predetermined or rated temperature level or value, the thermal fuse or fusible link 164 will melt and effectively open or break the electrical circuit thereby terminating electrical power to the hot melt adhesive heater circuit or resistance wire 108 so as to effectively prevent overheating of, and thermal degradation and damage to, the hot melt adhesive hose assembly 100. Alternatively, but in a similar manner, as illustrated within FIG. 3, in accordance with second principles and teachings of the present invention, an elongated thermal fuse or fusible link 164', similar to the elongated thermal fuse or fusible link 164, may be disposed within the electrical circuit which provides electrical power to the temperature sensor, temperature sensing device, or temperature sensing element 112. More particularly, the elongated thermal fuse or fusible link 164' may effectively be incorporated within the second lead wire 128 so as to effectively be disposed in series with the temperature sensor, temperature sensing device, or temperature sensing element 112.

In this manner, if the thermal fuse or fusible link 164 experiences or detects an elevated temperature level or value, at any particular region or area of the hot melt adhesive hose assembly 100, which exceeds its predetermined or rated temperature level or value, the thermal fuse or fusible link 164 will melt and effectively open or break the electrical power circuit operatively associated with the temperature sensor, temperature sensing device, or temperature sensing element 112. Accordingly, a suitable signal can be transmitted from the temperature sensor, temperature sensing device, or temperature sensing element 112 to the controller, not shown but operatively associated with the hot melt adhesive hose assembly 100 for controlling the energization of the hot melt adhesive heater circuit or resistance wire 108, whereby the controller can terminate electrical power to the hot melt adhesive heater circuit or resistance wire 108 so as to, once again, effectively prevent overheating of, and thermal degradation and damage to, the hot melt adhesive hose assembly 100. Alternatively, if or when the elongated thermal fuse or fusible link 164 experiences or detects an elevated temperature level or value, at any particular region or area of the hot melt adhesive hose assembly 100, which exceeds its predetermined or rated temperature level or value and thereby causes the thermal fuse or fusible link 164 to melt and effectively open or break the electrical power circuit operatively associated with the temperature sensor, temperature sensing device, or temperature sensing element 112, a suitable alarm signal can be generated so as to alert operator personnel who can then effectively shut down the entire hot melt adhesive dispensing operation by terminating electrical power to the hot melt adhesive hose assembly 100 and, in particular, to the hot melt adhesive heater circuit or resistance wire 108 thereof.

Thus, it may be seen that in accordance with the principles and teachings of the present invention, there has been provided a new and improved hot melt adhesive hose assembly which comprises a hot melt adhesive heating circuit or resistance wire wrapped in a substantially spiral manner around an external surface portion of the hot melt adhesive hose assembly, and an elongated thermal fuse or fusible link which is likewise wrapped in a substantially spiral manner around the external surface portion of the hot melt adhesive hose assembly such that successive spiral turns of the elongated thermal fuse or fusible link are effectively disposed parallel to, but axially spaced from, the successive spiral turns of the hot melt adhesive heating circuit or resistance wire by means of a predetermined axial spacing or pitch. In addition, the elongated thermal fuse or fusible link may be electrically connected in series with the hot melt adhesive heating circuit or resistance wire so as to effectively terminate electrical power to the hot melt adhesive heating circuit or resistance wire as a result of the melting of the thermal fuse or fusible link, and the consequent opening of the electrical power circuit or path within which the hot melt adhesive heating circuit or resistance wire and the thermal fuse or fusible link are disposed, when the thermal fuse or fusible link experiences or detects an excessively high temperature level or value. Alternatively, the elongated thermal fuse or fusible link may be electrically connected in series with the hot melt adhesive temperature sensor, temperature sensing device, or temperature sensing element so as to likewise effectively terminate electrical power to the hot melt adhesive heating circuit or resistance wire, through means of the hot melt adhesive assembly controller or an alarm system summoning operator personnel, as a result of the melting of the thermal fuse or fusible link, and the consequent opening of the electrical power circuit or path within which the hot melt adhesive temperature sensor, temperature sensing device, or temperature sensing element, and the thermal fuse or fusible link, are disposed, when the thermal fuse or fusible link experiences or detects an excessively high temperature level or value.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A hot melt adhesive hose assembly, comprising:
   a hose conduit for conducting hot melt adhesive material from a hot melt adhesive supply end portion of said hose conduit, which is adapted to be fluidically connected to a supply of hot melt adhesive material, to a hot melt adhesive applicator end portion of said hose conduit which is adapted to be fluidically connected to a hot melt adhesive material applicator for dispensing hot melt adhesive material;
   an electrical power supply circuit;
   a heater circuit operatively connected to said hose conduit for heating said hose conduit, when said heater circuit is electrically connected to said electrical power supply circuit, so as to maintain the temperature of the hot melt adhesive material, being conducted through said hose conduit, at a predetermined temperature level;
   a temperature sensor operatively connected to said hose conduit for detecting the temperature of said hose conduit so as to ensure that said heater circuit is properly heating said hose conduit in order to maintain the temperature of the hot melt adhesive material, being conducted through said hose conduit, to the predetermined temperature level; and
   fusible link means operatively connected to said hose conduit for detecting a temperature level which exceeds said predetermined temperature level of the hot melt adhesive material being conducted through said hose conduit, at substantially any location located along substantially the entire longitudinal extent of said hose conduit so as to terminate power to said heater circuit in order to prevent thermal damage to said hose conduit.

2. The assembly as set forth in claim 1, wherein:
   said temperature sensor is selected from the group comprising a resistance temperature detector (RTD), a thermistor, and a thermocouple.

3. The assembly as set forth in claim 1, wherein:
   said heater circuit comprises a resistance wire spirally wrapped around first external surface portions of said hose conduit.

4. The assembly as set forth in claim 2, wherein:
   said resistance wire is spirally wrapped around said first external surface portions of said hose conduit such that a predetermined pitched spacing is defined between successively wound coils of said resistance wire.

5. The assembly as set forth in claim 4, wherein:
   said fusible link means comprises a wire spirally wrapped around second external surface portions of said hose conduit.

6. The assembly as set forth in claim 5, wherein:
   said fusible link wire is spirally wrapped around said second external surface portions of said hose conduit such that a predetermined pitched spacing is defined between successively wound coils of said fusible link wire.

7. The assembly as set forth in claim 6, wherein:
   said successively wound coils of said fusible link wire are interposed between said successively wound coils of said resistance wire.

8. The assembly as set forth in claim 1, wherein:
   said fusible link means is fabricated from a material which will melt at a predetermined temperature level.

9. The assembly as set forth in claim 1, wherein:
   said fusible link means is electrically connected in series with said heater circuit.

10. The assembly as set forth in claim 1, wherein:
    said fusible link means is electrically connected in series with said temperature sensor.

11. A hot melt adhesive hose assembly, comprising:
    a hose conduit for conducting hot melt adhesive material from a hot melt adhesive supply end portion of said hose conduit, which is adapted to be fluidically connected to a supply of hot melt adhesive material, to a hot melt adhesive applicator end portion of said hose conduit which is adapted to be fluidically connected to a hot melt adhesive material applicator for dispensing hot melt adhesive material;
    an electrical power supply circuit;
    a heater circuit operatively connected to said hose conduit for heating said hose conduit, when said heater circuit is electrically connected to said electrical power supply circuit, so as to maintain the temperature of the hot melt adhesive material, being conducted through said hose conduit, at a predetermined temperature level;
    a temperature sensor operatively connected to said hose conduit for detecting the temperature of said hose conduit so as to ensure that said heater circuit is properly heating said hose conduit in order to maintain the temperature of the hot melt adhesive material, being conducted through said hose conduit, to the predetermined temperature level; and thermal fuse means operatively connected to said hose conduit for detecting a temperature level which exceeds said predetermined temperature level of the hot melt adhesive material being conducted through said hose conduit, at substantially any location located along substantially the entire longitudinal extent of said hose conduit so as to terminate power to said heater circuit in order to prevent thermal damage to said hose conduit.

12. The assembly as set forth in claim 11, wherein:

said temperature sensor is selected from the group comprising a resistance temperature detector (RTD), a thermistor, and a thermocouple.

13. The assembly as set forth in claim 11, wherein:

said heater circuit comprises a resistance wire spirally wrapped around first external surface portions of said hose conduit.

14. The assembly as set forth in claim 12, wherein:

said resistance wire is spirally wrapped around said first external surface portions of said hose conduit such that a predetermined pitched spacing is defined between successively wound coils of said resistance wire.

15. The assembly as set forth in claim 14, wherein:

said thermal fuse means comprises a wire spirally wrapped around second external surface portions of said hose conduit.

16. The assembly as set forth in claim 15, wherein:

said thermal fuse wire is spirally wrapped around said second external surface portions of said hose conduit such that a predetermined pitched spacing is defined between successively wound coils of said thermal fuse wire.

17. The assembly as set forth in claim 16, wherein:

said successively wound coils of said thermal fuse wire are interposed between said successively wound coils of said resistance wire.

18. The assembly as set forth in claim 11, wherein:

said thermal fuse means is fabricated from a material which will melt at a predetermined temperature level.

19. The assembly as set forth in claim 11, wherein:

said thermal fuse means is electrically connected in series with said heater circuit.

20. The assembly as set forth in claim 11, wherein:

said thermal fuse means is electrically connected in series with said temperature sensor.

\* \* \* \* \*